United States Patent [19]
Lent et al.

[11] Patent Number: 5,929,134
[45] Date of Patent: *Jul. 27, 1999

[54] INK JET COMPOSITION AND METHOD

[75] Inventors: Bruce A. Lent, Oak Park; Adrian M. Loria, Wilmette, both of Ill.

[73] Assignee: Videojet Systems International, Inc., Wood Dale, Ill.

[ * ] Notice: This patent is subject to a terminal disclaimer.

[21] Appl. No.: 08/484,602

[22] Filed: Jun. 7, 1995

Related U.S. Application Data

[62] Division of application No. 08/158,716, Nov. 26, 1993, abandoned, which is a continuation of application No. 07/692,300, Apr. 26, 1991, abandoned, which is a continuation-in-part of application No. 07/543,161, Jun. 25, 1990, abandoned.

[51] Int. Cl.$^6$ ..................................................... C09D 11/10
[52] U.S. Cl. ......................... 523/161; 524/495; 524/496; 524/596; 524/841; 106/31.13
[58] Field of Search ........................ 523/161; 106/20 D, 106/20 R, 31.13; 524/495, 496, 596, 841

[56] References Cited

U.S. PATENT DOCUMENTS

| | | | |
|---|---|---|---|
| 4,124,554 | 11/1978 | Fry | 523/412 |
| 4,202,808 | 5/1980 | Fan | 523/410 |
| 4,246,154 | 1/1981 | Yao | 524/88 |
| 5,316,575 | 5/1994 | Lent et al. | 106/20 R |

*Primary Examiner*—Marion McCamish
*Assistant Examiner*—John J. Guarriello
*Attorney, Agent, or Firm*—Leydig, Voit & Mayer, Ltd.

[57] ABSTRACT

An ink composition suitable for ink jet printing operations comprising an aqueous resin dispersion and an aqueous colorant where said ink composition is substantially free of volatile organic compounds. Compositions are provided that form printed images that, without curing, are solvent-washable with isopropanol, ethanol, water, and mixtures thereof, and are retortable, without curing. Ink jet compositions capable of forming colored images capable of being washed with isopropanol, ethanol, water, and mixtures thereof, after curing, are also provided. Finally, ink jet inks capable of withstanding washing with strong organic solvents, such as methylethylketone and methanol, after curing, are also provided.

3 Claims, No Drawings

INK JET COMPOSITION AND METHOD

CROSS REFERENCE TO RELATED APPLICATION

This is a divisional of application Ser. No. 08/158,716 filed Nov. 26, 1993, now abandoned, which is a continuation of Ser. No. 07/692,300 filed Apr. 26, 1991, which is a continuation-in-part of Ser. No. 07/543,161 filed Jun. 25, 1990, now abandoned.

FIELD OF THE INVENTION

The present invention relates to ink jet printing compositions and, more particularly, to ink jet printing compositions that adhere to nonporous substrates and have reduced levels of volatile organic compounds.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream electronically so that the droplets are caused to form the desired printed image on that surface. This technique of noncontact printing is particularly well suited for application of characters onto irregularly shaped surfaces, including, for example, the bottom of beverage containers.

In general, an ink jet composition must meet certain rigid requirements to be useful in ink jet printing operations. These relate to viscosity, resistivity, solubility, compatibility of components and wetability of the substrate. Further, the ink must be quick-drying and smear resistant, must be capable of passing through the ink jet nozzle without clogging, and must permit rapid cleanup of the machine components with minimum effort.

Many of the surfaces on which ink jet printing is utilized are nonporous, such as the above-mentioned beverage container. The ink used for these applications must adhere well to the nonporous substrate and normally must be water-resistant. Presently used ink for such applications conventionally contains a resin, a dye, a carrier, and other components.

Heretofore, to obtain satisfactory adhesion of a water-resistant ink jet composition to a nonporous substrate, it has been necessary to use an organic solvent as the carrier to dissolve the resin and/or the dye. For example, U.S. Pat. No. 4,260,531 discloses an ink jet printing composition comprising a styrene-acrylic copolymer resin, a dye, and a mixture of water and one or more water-miscible $C_1$–$C_3$ alcohols as the diluent. U.S. Pat. No. 4,246,154 discloses an ink jet printing composition comprising an aqueous vinyl polymer suspension which is added to a solution of a hydrophobic dye previously dissolved in an organic solvent.

Use of these organic solvents poses toxicity and flammability problems for the ink jet formulator. However, the use of organic solvents is undesirable for an additional reason—they pose an environmental hazard. After the ink has been applied to the substrate, the solvent evaporates, releasing organic compounds into the atmosphere. These volatile organic compounds adversely affect the environment in the atmosphere and are the subject of both federal and state governmental regulations.

Volatile organic compounds are defined as any compound of carbon that evaporates from a paint or coating film under specific test conditions. The amount of volatile organic compounds, present in a given composition in grams per liter of coating, also known as volatile organic content (VOC), can be determined by using the following formula:

$$VOC(g/l) = \frac{W_s - W_w - W_{es}}{V_m - V_w - V_{es}}$$

where
  $W_s$ is the weight of volatile compounds in grams;
  $W_w$ is the weight of water in grams;
  $W_{es}$ is the weight of exempt compounds in grams;
  $V_m$ is the volume of material in liters;
  $V_w$ is the volume of water in liters; and
  $V_{es}$ is the volume of exempt compounds in liters.

In the above formula, exempt compounds are volatile organic compounds whose use is specifically sanctioned by regulatory agencies. Trichloroethane is an example of an exempt compound.

The maximum acceptable level of volatile organic compounds varies for different coating applications. For example, the maximum acceptable level of volatile organic compounds set for the aerospace coatings industry is 340 grams/liter. However, until the present invention, there was no ink jet composition that met any of the government standards and still had the qualities necessary for satisfactory use in ink jet printing operations on nonporous substrates.

From the foregoing it is clear that a general need exists for a substantially organic solvent-free, ink jet composition that adheres to nonporous substrates and is water-resistant, as well as for an ink jet composition which poses minimal toxicity and flammability problems, while being easily disposable by the formulator and end user. A specific need also exists for an ink jet composition suitable for use in ink jet printing operations on nonporous substrates which has a volatile organic compound level less than 500 grams/liter, preferably less than 340 grams/liter. Although such needs in the art have existed for years, no practical solution has yet been found.

Certain specialized application needs also exist which remain unfilled by present-day ink jet formulations. In many instances printed images formed from the ink jet printing operation are printed onto substrates which must be sterilized, as through steam sterilization. For such applications, the ink jet formulation must be capable of forming printed images that remain substantially unaffected after retorting. Such retortability is especially critical with respect to containers for use in the food industry. Generally, such containers are made of glass or are cans made of tin-free steel ("TFS") or aluminum.

In other instances, the substrate with the printed image thereon must be exposed to aqueous and/or nonaqueous solvent-washing procedures. For such applications the jet ink must be capable of forming printed images that withstand solvents, such as isopropanol, ethanol, water, and mixtures thereof, and in other instances, contact with methylethylketone ("MEK") or methanol.

Heretofore, ink jet printing formulations meeting the aforementioned and other needs have not been available, or have been available only in formulations that contain large quantities of volatile solvents. Such needs are now satisfied by the present invention, the description of which follows.

SUMMARY OF THE INVENTION

The present invention provides an ink composition for use in ink jet applications which is substantially free of volatile organic compounds. The composition utilizes an aqueous resin and an aqueous colorant instead of organic solvents. As a result, the toxicity, flammability and disposal problems inherent in the use of organic solvents are avoided. More importantly, the ink composition of the present invention complies with the present government standards for acceptable levels of volatile organic compounds.

Further, the present invention provides black, ink jet compositions that directly after application to a nonporous substrate are retortable and resist solvents such as isopropanol, ethanol, water and mixtures thereof. The printed images formed from such inks may be heat-cured to render the images also resistant to other organic solvents, such as methanol and MEK.

Additionally, the present invention provides colored ink jet compositions that may be printed onto nonporous substrates and, if additional solvent resistance is desired, the printed images formed from such jet ink compositions may be heat-cured to provide images that resist attack or degradation from contact with isopropanol, ethanol, water and mixtures thereof.

DETAILED DESCRIPTION OF THE PREFERRED EMBODIMENTS

As described hereinabove, the ink compositions of the present invention comprise an aqueous resin dispersion, an aqueous colorant, water, and other optional components which may be present in carefully balanced proportions to achieve preferred operation of the ink in an ink jet printing apparatus.

In one embodiment, the present invention provides an ink composition suitable for ink jet printing onto a nonporous surface selected from the group consisting of glass, tin-free steel and aluminum, to form printed images (1) on tin-free steel and aluminum capable of being retorted, without prior heat curing or (2) on glass, tin-free steel and aluminum, with heat curing, capable of being washed with water, isopropanol, ethanol, or mixtures thereof, without substantial degradation of the printed images, said composition comprising an aqueous resin dispersion selected from the group consisting of aqueous vinyl resin dispersions and aqueous phenolic resin dispersion, and carbon black, said composition being substantially free of volatile organic compounds.

In another embodiment there is provided an ink composition suitable for ink jet printing onto a nonporous surface selected from the group consisting of glass, tin-free steel and aluminum, to form printed images (1) capable of being retorted, without prior heat curing or (2) with heat curing, capable of being washed with methylethylketone or methanol, without substantial degradation of the printed images, said composition comprising an aqueous phenolic resin dispersion, and carbon black, said composition being substantially free of volatile organic compounds.

In yet another embodiment, there is provided an ink composition suitable for ink jet printing onto a nonporous surface selected from the group consisting of glass, tin-free steel and aluminum, to form colored, printed images that,, after prior heat curing, are capable of being washed with water, ethanol or isopropanol without substantial degradation of said printed images, said composition comprising an aqueous resin dispersion selected from the group consisting of aqueous vinyl resin dispersions and aqueous phenolic resin dispersion, and a dye having a functional group capable of reacting with said vinyl or phenolic resin under elevated temperature conditions to form a covalent bond, said composition being substantially free of volatile organic compounds.

The present invention also provides a method of forming sterilized, printed images, on a nonporous substrate selected from the group consisting of tin-free steel and aluminum, comprising printing onto said substrate, by ink jet printing, a jet ink comprising an aqueous resin dispersion selected from the group consisting of aqueous vinyl resin dispersions and aqueous phenolic resin dispersion, and carbon black, said composition being substantially free of volatile organic compounds and, without prior heat curing, retorting said substrate.

A method of forming sterilized, printed images, on a glass substrate is also provided, comprising printing onto said substrate, by ink jet printing, a jet ink comprising an aqueous phenolic resin dispersion, and carbon black, said composition being substantially free of volatile organic compounds and, without prior heat curing, retorting said substrate.

In addition there is provided a method of forming solvent-washed, printed images, on a nonporous substrate selected from the group consisting of glass, tin-free steel and aluminum, comprising printing onto said substrate, by ink jet printing, a jet ink comprising an aqueous resin dispersion selected from the group consisting of aqueous vinyl resin dispersions and aqueous phenolic resin dispersion, and carbon black, said composition being substantially free of volatile organic compounds and, without prior heat curing, washing the printed substrate with a solvent selected from the group consisting of ethanol, isopropanol, water and mixtures thereof.

There is further provided a method of forming solvent-washed, printed images, on a nonporous substrate selected from the group consisting of glass, tin-free steel and aluminum, comprising printing onto said substrate, by ink jet printing, a jet ink comprising an aqueous phenolic resin dispersion, and carbon black, said composition being substantially free of volatile organic compounds and, after prior heat curing, washing the printed substrate with a solvent selected from the group consisting of methylethylketone and methanol.

A method of forming solvent-washed, printed images, on a nonporous substrate selected from the group consisting of glass, tin-free steel and aluminum, is also provided, comprising printing onto said substrate, by ink jet printing, a jet ink comprising an aqueous resin dispersion selected from the group consisting of aqueous vinyl resin dispersions and aqueous phenolic resin dispersions, and a dye having a functional group capable of reacting with said vinyl or phenolic resin under elevated temperature conditions to form a covalent bond, said composition being substantially free of volatile organic compounds and, after prior heat curing, washing the printed substrate with a solvent selected from the group consisting of ethanol, isopropanol, water and mixtures thereof.

In general, the ink compositions of the present invention exhibit the following characteristics for use in ink jet printing systems: (1) a viscosity from about 1.6 to about 7.0 centipoises at 25° C.; (2) an electrical resistivity from about 50 to about 2000 ohm-cm; and (3) a sonic velocity from about 1200 to about 1300 meters/second.

The inks dry within about 4–6 seconds, with good adhesion when printed on nonporous substrates, such as bare tinplate, aluminum, polymeric-coated tin or aluminum, or polymeric-coated tin cans, TFS, glass, or aluminum.

The ink compositions of the present invention may also be used for graphic applications on porous substrates such as paper, glossy paper, Tyvek® envelopes, corrugated cardboard and other graphic paper products. Additionally, where carbon black is used as the colorant, the ink composition of the present invention can be used to print bar codes that can be scanned visually or by infrared (IR) spectroscopy.

The ink compositions of the present invention are, as indicated, also substantially free of volatile organic compounds. To be substantially free of volatile organic compounds, the ink composition should be formulated so that it has a volatile organic compound level (VOC) of less than 500 grams/liter. Preferably, the ink compositions of the present invention have a volatile organic compound level of less than 340 grams/liter, with a volatile organic compound level of 300 grams/liter or less being most preferred.

Suitable aqueous resin dispersions for use in the ink compositions of the present invention must meet certain requirements. The resin particles in the dispersion should be uniform in size, with a particle size from about 0.01 to about 1.0 microns. The dispersion should also be stable. Dispersion properties should remain constant at temperatures up to about 120° F., and the dispersion should not show any sedimentation for at least 18 months. There should additionally be no agglomeration of resin particles in the dispersion.

The type of aqueous dispersion used depends on the specific needs of the end user. Examples of suitable aqueous resin dispersions are polyester resin dispersions (commercially available as 72-7230 from Cargill Inc.), styrene-acrylic dispersions (commercially available as Acrysol WS-68 from Rohm & Haas), aromatic urethane dispersions (commercially available as Spensol L-44 from Reichold Chemicals, Inc.), aliphatic urethane dispersions (commercially available as Spensol L-52 from Reichold Chemicals, Inc.), alkyl dispersions (commercially available as Arolon 585 from NL Chemicals Co.), epoxy resin dispersions (available as CMD 35201 from Hi-Tek Polymers, Inc.), vinyl dispersions (commercially available as UCAR AW-875) or phenolic dispersions (commercially available as UCAR BRUA-2370). This list is not exhaustive; other aqueous resin dispersions not specifically mentioned above may also be used depending on the nature of the ink jet printing application. In general, these aqueous resin dispersions are present in the ink composition in an amount from about 20% to 60% by weight of the composition.

Suitable aqueous colorants for use in the present invention include both pigment dispersions and dyes. These colorants, which are added directly to the aqueous resin dispersion, may or may not be water-resistant, depending upon the desired application. The aqueous colorants used in the present invention are used directly, without the need for incorporation into polymeric resin particles, as is necessary with the compositions of U.S. Pat. No. 4,246,154.

As indicated, one of the water-resistant colorants useful in the present invention is carbon black, which is commercially available in a pigment dispersion as Black Acroverse Dispersion #32B32D from Penn Color. When immediate solvent resistance is desired, the carbon black may be used in combination with a vinyl or phenolic water-dispersed resin. When printed onto nonporous substrates such as glass, aluminum, and TFS, such inks do not require curing to afford resistance to solvents such as isopropanol, ethanol, water, and mixtures thereof.

Further, if carbon black is used as the colorant and a phenolic water-dispersed resin is employed as the, resin, after curing, the printed images are resistant to strong organic solvents such as methanol and MEK. Curing of the carbon black/phenolic resin-type of ink composition may be accomplished under noncritical curing conditions. Typically, curing temperatures will be from about 100° C. to about 150° C., preferably from about 125° C. to about 150° C., and curing times will be from about 15 seconds to about 60 seconds, preferably from about 30 seconds to about 60 seconds. A general cure condition is about one minute at about 150° C.

Examples of other water-resistant colorants useful in the present invention are those pigments listed in Table 1 below.

TABLE 1

| COLOR INDEX NUMBER | PRODUCT NAME |
| --- | --- |
| Pigment Yellow 14 | FLEXO PLUS Yellow Paste WY-7714 |
| Pigment Yellow 14 | FLEXO PLUS Yellow Paste WY-7724 |
| Pigment Yellow 14 | FLEXO PLUS Yellow Paste WY-7784 |
| Pigment Orange 46 | FLEXO PLUS Orange Paste WO-7783 |
| Pigment Red 49 | FLEXO PLUS Red Paste WR-7789 |
| Pigment Blue 15:3 | FLEXO PLUS Blue Paste WB-7785 |
| Pigment Blue 15:3 | FLEXO PLUS Blue Paste WB-7715 |

If the ink jet composition need not be water resistant, virtually any acidic or basic aqueous dye can be utilized. Examples of dyes include those listed in Table 2 below.

TABLE 2

| COLOR INDEX NUMBER | PRODUCT NAME |
| --- | --- |
| Acid Red 73 | Special Croceine MOO-S |
| Direct Red 254 | Special Fast Red 8BF Liquid |
| Acid Violet 17 | Special Violet S4B-S |
| Direct Violet 99 | Special Brilliant Violet BRW Liquid |
| Acid Blue 104 | Special Brilliant Blue FFR Uncut |
| Acid Blue 145 | Special Blue CD-FG 135 |
| Direct Blue 86 | Special Fast Turquoise 8GP |
| Direct Blue | Special Blue FS |
| — | Black 7984 |
| Acid Black | TELON Fast Black LG Liquid 40 |
| Direct Black | Special Black SP Liquid |
| Direct Black 19 | Special Fast Black G Uncut |
| Acid Black 2 | Nigrosine WLF |
| Acid Black 2 | Nigrosine WLF Uncut |
| Acid Black 2 | ACILAN Nigrosine W Liquid |
| — | Special Black 46018 |
| — | Reac-tint Black 7929-39 |
| — | (available from Milliken Chemcal) |
| — | Reac-tint Red 26B-50 |
| — | (available from Milliken Chemical) |
| — | Reac-tint Violet X80 |
| — | (available from Milliken Chemical) |
| — | Reac-tint Green X-8218 |
| — | (available from Milliken chemical) |

Further, when the ink compositions are to be used for applications that require colored images that are resistant to solvents such as isopropanol, methanol, water and mixtures thereof, the dyes should contain functional groups that are capable of forming a covalent bond with the resin. For example, hydroxyl groups that are present in dyes containing a polyol moiety, are capable of reacting with resin that also contain functional groups, when subjected to heat-curing. Representative dyes for such applications include the following:

Polyol Colorant Red A45-2 (Milliken Chemicals)
Polyol Colorant Blue A45-1 (Milliken Chemicals)
Polyol Colorant Yellow A45-3 (Milliken Chemicals)

Basic Violet 3
Acid Black 2
Acid Red 137

Representative resins for use in forming a covalent bond or linkage with the functional group-containing dyes include vinyl resins and phenolic resins. Thus, when solvent resistance of the final printed image is desired, a combination of a dye having a reactive functional group and a resin containing a functional group capable of reacting, under elevated temperature conditions, with the functional group of the dye is required. There then is formed a covalent bond between the dye and the resin, after the ink is used to print an image on the desired substrate and the substrate is then subjected to heat curing.

Suitable aqueous vinyl resin dispersions include those disclosed in U.S. Pat. Nos. 4,415,698; 4,202,808, and 3,862,076, all of which are hereby incorporated by reference, and those aqueous vinyl resin dispersions marketed by Union Carbide Corporation under the trademark UCAR AW-875 and other members of that series.

Suitable aqueous phenolic resin dispersions include those disclosed in U.S. Pat. Nos. 4,788,236; 4,420,571; 4,366,303; 4,206,095; 4,124,554; 4,039,525; and 4,026,848, all of which are hereby incorporated by reference, and those aqueous vinyl resin dispersions marketed by Union Carbide Corporation under the trademark UCAR BKUA-2370 and other members of that series.

The temperature at which the heat curing occurs is not critical, nor is the time of curing. Obviously, the length of the cure time will vary with the cure temperature. The only requirement is that the curing conditions be such that the covalent bond is formed between the dye and the resin, without substantially degrading the components of the ink jet composition. Typically, curing temperatures will be from about 100° C. to about 150° C., preferably from about 145° C. to about 160° C., and curing times will be from about 15 seconds to about 60 seconds, preferably from about 30 seconds to about 60 seconds. A general cure condition is about one minute at about 150° C.

In general, if an aqueous pigment dispersion is used, the dispersion should be present in the ink composition in an amount from about 5% to about 20% by weight of the composition. If an aqueous dye is used, it should be present in an amount from about 2% to about 5% by weight of the ink composition.

Water is used as the carrier for the aqueous resin dispersion and the aqueous colorant in the ink compositions of the present invention. Typically, water is present in an amount from about 40% to about 80% by weight of the ink composition.

Other components may also be included in the ink compositions of the present invention to impart characteristics desirable for ink jet printing applications. These components include defoamers, which improve processing and printer performance. Suitable defoamers include acetylenic diols (commercially available as Surfynol 104 from Air Products and Chemicals, Inc.) and butanol. Small amounts of organic solvents may also be added to improve drying time and reduce surface tension. Suitable solvents include n-methyl-2-pyrrolidone and butanol.

It also may be desirable to add humectants, such as ethylene glycol or propylene glycol methyl ether, to prevent the ink jet tip from drying. Electrolytes can be added to adjust the specific resistivity of the ink. Usable electrolytes include dimethylamine hydrochloride and hydroxylamine hydrochloride. Finally, crosslinking resins, such as melamine resins, may be added to cross link with other polymers to give improved adhesion and increased solvent resistance.

The following examples are illustrative of ink compositions of the present invention.

EXAMPLE I

The following composition was formulated:

| | |
|---|---|
| 72-7230 (aqueous polyester dispersion) | 40.0% by weight |
| Acroverse Dispersion # 32B32D (carbon black dispersion) | 10.0% by weight |
| Water | 46.3% by weight |
| Surfynol 104 (defoamer) | 0.7% by weight |
| N-methyl-2-pyrrolidone (solvent) | 1.0% by weight |
| Propylene glycol monomethyl ether | 2.0% by weight |
| | 100.0 % by weight |

The resulting ink composition had a viscosity of 3.0 cps, a resistivity of 190 ohm-cm, and adhered well to nonporous substrates such as tin plate, glass and plastics. The level of volatile organic compounds present in the ink composition was 289 grams/liter.

EXAMPLE II

The following composition was formulated:

| | |
|---|---|
| Acrysol WS-68 (styrene-acrylic dispersion) | 30.0% by weight |
| Special Black SP Liquid | 10.0% by weight |
| Deionized water | 55.0% by weight |
| Propylene glycol monomethyl ether | 3.0% by weight |
| Butanol | 2.0% by weight |
| | 100.0% by weight |

The resulting ink composition had a viscosity of 3.0 cps, a resistivity of 194 ohm-cm, and adhered well to metal. The level of volatile organic compounds present in the ink composition was 348 grams/liter.

EXAMPLE III

The following composition was formulated:

| | |
|---|---|
| 72-7230 (aqueous polyester dispersion) | 50.09% by weight |
| Special Black SP Liquid | 10.0% by weight |
| Reac-tint Red 26B-50 | 1.0% by weight |
| Deionized water | 35.0% by weight |
| Surfynol 104 (defoamer) | 0.7% by weight |
| Propylene glycol monomethyl ether | 2.0% by weight |
| Triethylamine | 0.3% by weight |
| N-methyl-2-pyrrolidone | 1.0% by weight |
| | 100.0% by weight |

The resulting ink composition had a viscosity of 3.43 cps, a resistivity of 192 ohm-cm, and adhered well to metal, The level of volatile organic compounds present in the ink composition was 202.7 grams/liter.

EXAMPLE IV

The following composition was formulated:

| | |
|---|---|
| CMD 35201 (epoxy resin dispersion) | 20.0% by weight |
| Special Black SP dispersion | 10.0% by weight |
| Deionized water | 61.0% by weight |

-continued

| | |
|---|---|
| Melamine resin | 4.0% by weight |
| Propylene glycol monomethyl ether | 3.0% by weight |
| Butanol | 2.0% by weight |
| | 100.0% by weight |

The resulting ink composition had a viscosity of 5.0 cps, a resistivity of 204 ohm-cm, and adhered well to metal. The level of volatile organic compounds present in the ink composition was 323 grams/liter.

EXAMPLE V

The following composition was formulated:

| | |
|---|---|
| 72-7230 (aqueous polyester dispersion) | 50.0% by weight |
| Reac-tint Black 7929-38 | 4.0% by weight |
| Reac-tint Red 26B-50 | 0.3% by weight |
| Deionized water | 44.5% by weight |
| Surfynol 104 | 0.7% by weight |
| Triethylamine | 0.5% by weight |
| | 100.0% by weight |

The resulting jet ink had a viscosity of 3.56 cps, a resistivity of 348 ohm-cm, and adhered well to metal. The level of volatile organic compounds present in the ink composition was 223.6 grams/liter.

EXAMPLE VI

The following ink jet composition capable of producing solvent-resistant images, without curing, was formulated:

| | |
|---|---|
| Waterborne Vinyl Resin Dispersion (Union Carbide) | 40.0% by weight |
| Propylene Glycol Methyl Ether | 2.0% by weight |
| N-Methyl-2-Pyrrolidone | 1.0% by weight |
| Surfynol 104 (50% in Ethylene Glycol) | 0.7% by weight |
| Carbon Black Dispersion (Penn Color) | 10.0% by weight |
| Deionized Water | 46.3% by weight |
| | 100.0% by weight |

The ink of this composition is found to form ink jet printed images on TFS, aluminum and glass, that, without curing, resist solvent rubs with water, isopropanol, or ethanol. Further, it is found that the printed images made through the ink jet printing of the ink composition of this invention onto TFS and aluminum, without heat curing, are capable of resisting retorting.

EXAMPLE VII

The following ink jet composition, capable of producing solvent-resistant images, with curing, was formulated:

| | |
|---|---|
| Waterborne Phenolic Resin Dispersion (Union Carbide) | 40.0% by weight |
| Propylene Glycol Methyl Ether | 2.0% by weight |
| N-Methyl-2-Pyrrolidone | 1.0% by weight |
| Surfynol 104 (50% in Ethylene Glycol) | 0.7% by weight |
| Carbon Black Dispersion (Penn Color) | 10.0% by weight |
| Deionized Water | 46.3% by weight |
| | 100.0% by weight |

The ink of this composition is found to form printed images that, without curing, resist solvent rubs with water, isopropanol, or ethanol. It is also found that the printed images made through the ink jet printing of the ink composition of this invention onto glass, as well as onto TFS and aluminum, without heat curing, are capable of resisting retorting. Further, it is found that the printed images made through the ink jet printing of the ink composition of this invention onto TFS, aluminum and glass, after curing at 150° C., for not more than one minute, are capable of resisting methanol and MEK

EXAMPLE VIII–XVI

Ink jet formulations capable of producing solvent-resistant colored images, after curing, having the compositions set forth in Table I, were formulated. It is found that the printed images made through the ink jet printing of the ink composition of this invention onto TFS, aluminum and glass, after curing at 150° C., for not more than one minute, are capable of resisting water, isopropanol and ethanol.

TABLE I

COLORED INK JET INKS

| | VIII | IX | X | XI | XII | XIII | XIV | XV | XVI |
|---|---|---|---|---|---|---|---|---|---|
| Waterborne Vinyl Resin Dispersion (Union Carbide) | 40.0% | 40.0% | 40.0% | 40.0% | — | 40.0% | 40.0% | — | — |
| Waterborne Phenolic Resin Dispersion (Union Carbide) | — | — | — | — | 40.0% | — | — | 40.0% | 40.0% |
| Propylene Glycol Methyl Ether | 2.0 | 2.0 | 2.0 | 2.0 | 2.0 | 2.0 | 2.0 | 2.0 | 2.0 |
| N-Methyl-2-Pyrrolidone | 1.0 | 1.0 | 1.0 | 1.0 | 1.0 | 1.0 | 1.0 | 1.0 | 1.0 |
| Surfynol 104 (50% in Ethylene Glycol) | 0.7 | 0.7 | 0.7 | 0.4 | 0.4 | 0.4 | 0.4 | 0.4 | 0.4 |
| Fluorochemical Surfactant FC-170C (3M) | 0.5 | 0.5 | 0.5 | — | — | — | — | — | — |
| Deionized Water | 51.8 | 51.8 | 51.8 | 54.6 | 54.6 | 53.6 | 53.6 | 53.6 | 53.6 |
| Polyol Colorant Red A45-2 (Milliken Chemicals) | 4.0 | — | — | — | — | — | — | — | — |
| Polyol Colorant Blue A45-1 (Milliken Chemicals) | — | 4.0 | — | — | — | — | — | — | — |

TABLE I-continued

COLORED INK JET INKS

| | VIII | IX | X | XI | XII | XIII | XIV | XV | XVI |
|---|---|---|---|---|---|---|---|---|---|
| Polyol Colorant Yellow A45-3 (Milliken Chemicals) | — | — | 4.0 | — | — | — | — | — | — |
| Basic Violet 3 | — | — | — | 2.0 | 2.0 | — | — | — | — |
| Acid Black 2 | — | — | — | — | — | 3.0 | — | 3.0 | — |
| Acid Red 137 | — | — | — | — | — | — | 3.0 | — | 3.0 |
| | 100.0% | 100.0% | 100.0% | 100.0% | 100.0% | 100.0% | 100.0% | 100.0% | 100.0% |

We claim:

1. An ink composition for ink jet printing onto a nonporous surface selected from the group consisting of glass, tin-free steel and aluminum, to form printed images (1) on tin-free steel and aluminum that can be retorted, without prior heat curing or (2) on glass, tin-free steel and aluminum, with heat curing, that resist washing with water, isopropanol, ethanol, or mixtures thereof, said composition comprising an aqueous resin dispersion selected from the group consisting of aqueous vinyl resin dispersions and aqueous phenolic resin dispersions, and carbon black, said composition having a volatile organic compound content less than 500 grams/liter.

2. An ink composition for ink jet printing onto a nonporous surface selected from the group consisting of glass, tin-free steel and aluminum, to form printed images (1) that can be retorted, without prior heat curing or (2) with heat curing, that resist washing with methylethylketone or methanol, said composition comprising an aqueous phenolic resin dispersion, and carbon black, said composition having a volatile organic compound content less than 500 grams/liter.

3. An ink composition suitable for ink jet printing onto a nonporous surface selected from the group consisting of glass, tin-free and aluminum, to form printed, colored images that, after prior heat curing, resist washing with water, ethanol or isopropanol said composition comprising an aqueous resin dispersion selected from the group consisting of aqueous vinyl resin dispersions and aqueous phenolic resin dispersions, and a dye having a functional group that will react with said vinyl or phenolic resin upon heat curing to form a covalent bond said composition having a volatile organic compound content less than 500 grams/liter.

* * * * *